United States Patent
Krohn-Holm

[15] 3,640,143
[45] Feb. 8, 1972

[54] GUIDE PULLEY AND A METHOD FOR THE PRODUCTION THEREOF

[72] Inventor: Danckert Krohn-Holm, Oscarsgt. 13, Oslo 3, Norway

[22] Filed: Mar. 10, 1970

[21] Appl. No.: 18,233

[30] Foreign Application Priority Data

Mar. 11, 1969 Norway ..................................1006/69

[52] U.S. Cl................................74/230.05, 74/229, 74/240
[51] Int. Cl..........................................................F16h 55/36
[58] Field of Search ..............74/230.01, 230.05, 230.5, 229, 74/240

[56] References Cited

UNITED STATES PATENTS

| | | | |
|---|---|---|---|
| 414,481 | 11/1889 | Arnold | 74/230.5 |
| 826,727 | 7/1906 | Koorie | 74/230.05 |
| 1,574,591 | 2/1926 | Adate | 74/240 |
| 1,981,196 | 11/1934 | Riblet | 74/230.5 |
| 2,218,854 | 10/1940 | Rabelos | 74/240 |
| 2,349,084 | 5/1944 | Findley | 74/240 |
| 2,841,020 | 7/1958 | Deventer | 74/230.01 |
| 3,010,626 | 11/1961 | Crockett, Jr. | 223/96 |

*Primary Examiner*—C. J. Husar
*Attorney*—Stevens, Davis, Miller & Mosher

[57] ABSTRACT

A guide pulley having a guiding groove shaped substantially as a hyperbolic body of rotation and the body guided thereby has at least a semicircular cross section rectilinearly moved at an acute angle to the pulley axis of rotation.

2 Claims, 1 Drawing Figure

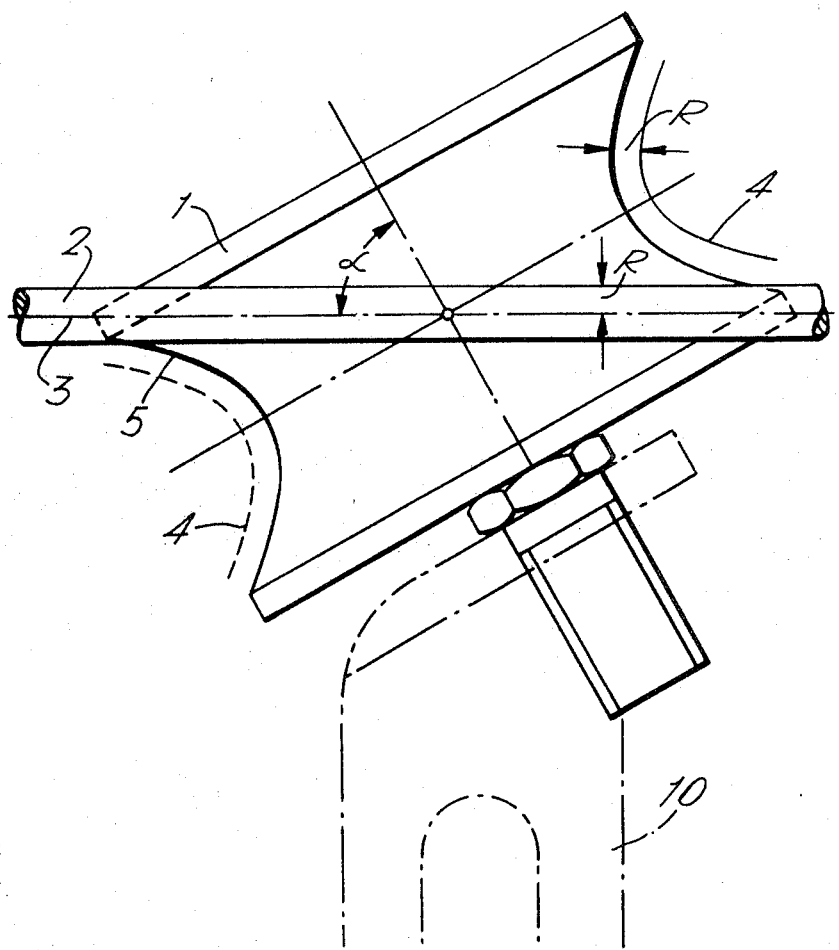

GUIDE PULLEY AND A METHOD FOR THE PRODUCTION THEREOF

The present invention relates to a guide pulley for belts, conveying belts, cables or the like, where the guiding groove of the pulley is shaped substantially as an hyperbolic body of rotation and where the body to be guided is provided with a contact surface having an essentially semicircular cross section with a radius R and is rectilinearly moved at an acute angle with the pulley axis of rotation. The invention also relates to a method for the production of a guide pulley as mentioned.

The present invention represents an improvement in the guide pulleys described in my U.S. Pat. Nos. 2,939,405, and 2,948,513.

The Norwegian specification 77,754 describes a guide pulley, the guiding surface of which forms a hyperbolic body of rotation, and where the belt edge follows the rectilinear generatrix of the groove pulley so that the belt edge rests against the guide pulley along the total length of the generatrix. This is desirable in order to distribute the forces acting between the belt edge and the guide pulley over a longer distance, i.e., to avoid "spot contact."

The ideal demand that the belt edge should rest against the groove pulley along its rectilinear generatrix cannot be realized in practice, however, because the belt edge has a certain extension perpendicular to said plane. To achieve a contact between the belt edge and the groove pulley along its generatrix one must take into consideration the thickness of the belt edge.

An object of the present invention is to provide a guide pulley which satisfies the above-mentioned demand.

According to the present invention this is achieved by a guide pulley of said type which is characterized by the fact that its guiding groove has an equidistance R at every point from a hyperbolic surface of rotation, which in relation to the pulley is described by the central axis of the body contact surface with the result that the body to be guided is in contact with the pulley along a generatrix of its guiding surface.

When the guiding groove is formed in this manner the flexible belt edge will automatically guide the belt back into its normal position in case of an inclined movement causing pressure towards the pulley. This is due to the fact that when the belt touches the pulley at a certain distance from the minimum radial cross section of the pulley, it is given a greater speed than when it is driven in its normal position. The cross tension condition within the belt will thus urge it back into its normal position.

Another object of the invention is to provide a method for the production of the pulley according to the invention.

The method is characterized by that the pulley blank is rotated in relation to a milling tool, which during its rotation around its own axis describes a cylindrical surface having the radius R, the milling tool axis of rotation having the same orientation in relation to the pulley blank axis of rotation as the axis describing said hyperbolic surface of rotation.

Thus, a method is provided which renders it possible to produce a guide pulley of said type having a practically mathematical precision without complicated process programmation and without the necessity of predetermining the profile of the guiding groove by mathematical calculations or geometrical constructions.

Below, the invention is described with reference to an embodiment shown in the drawing. The only Figure shows a guide pulley according to the invention arranged on a bracket.

A guide pulley 1 is rotatably mounted on a bracket 10 and guides a cable 2 running horizontally and having a circular cross section with the radius R. The cable takes a rectilinear course and forms an angle $\alpha$ with the axis of rotation of the guide pulley. The cable periphery will rest against the guide pulley along the generatrix of the surface of rotation 5, which can be defined as the surface having at every point a distance R from the hyperbolic surface of rotation described by the cable axis. This generatrix will have a certain helical course in contrast to the rectilinear generatrix of the hyperboloid.

Whereas these considerations mathematically presuppose a cable or belt contact surface of semicircular cross section, it will be evident that very good results can be achieved with contact surfaces of an approximately similar cross section, since the guide pulley in the guiding area will deform a flexible body so that it adapts itself to the guiding groove and a satisfactory contact is provided.

The drawing can also illustrate how such a guide pulley may be produced, as the milling tool rotating around its own axis 3 would describe a cylindrical surface 2 with the radius R and the milling tool axis of rotation would form an angle $\alpha$ with the axis of rotation of the guide pulley blank 1, which during its production would rotate in relation to the milling tool. Thus, a most accurate shape of the guide tool is achieved.

I claim:

1. A guide pulley device for supporting a cable or similar elongated element of circular cross section moving along a rectilinear path, said pulley device comprising a pulley having a guiding groove surface shaped substantially as a hyperbolic body of rotation, and means to mount said pulley with its axis of rotation at an acute angle with respect to said path whereby the cable to be guided passes said pulley in linear contact therewith along a generatrix of its guiding surface.

2. A method of producing a guide pulley having a guiding groove surface shaped substantially as a hyperbolic body of rotation comprising the steps of mounting a pulley blank at an angle with respect to a milling tool, rotating said pulley blank about its own axis, rotating said milling tool around its own axis to describe a cylindrical path, and simultaneously with both said rotations passing said milling tool linerally past the pulley blank thereby forming said hyperbolic body of rotation.

* * * * *